US010328859B2

(12) United States Patent
Arendsen

(10) Patent No.: US 10,328,859 B2
(45) Date of Patent: Jun. 25, 2019

(54) CONSOLE ASSEMBLY

(71) Applicant: Shanghai Yanfeng Jinqiao Automotive Trim Systems Co., Ltd., Plymouth, MI (US)

(72) Inventor: Randy Len Arendsen, Zeeland, MI (US)

(73) Assignee: Shanghai Yanfeng Jinqiao Automotive Trim Systems Co., Ltd., Plymouth, MI (US)

(*) Notice: Subject to any disclaimer, the term of this patent is extended or adjusted under 35 U.S.C. 154(b) by 73 days.

(21) Appl. No.: 15/363,480

(22) Filed: Nov. 29, 2016

(65) Prior Publication Data

US 2017/0072862 A1    Mar. 16, 2017

Related U.S. Application Data

(63) Continuation of application No. PCT/US2015/033829, filed on Jun. 2, 2015.
(Continued)

(51) Int. Cl.
*B60R 7/04* (2006.01)
*B62D 65/14* (2006.01)
*B60Q 3/51* (2017.01)

(52) U.S. Cl.
CPC ............. *B60R 7/04* (2013.01); *B60Q 3/51* (2017.02); *B62D 65/14* (2013.01)

(58) Field of Classification Search
CPC .............. B60R 7/04; B60Q 3/51; B62D 65/14
(Continued)

(56) References Cited

U.S. PATENT DOCUMENTS 5,887,929 A * 3/1999 Miller ................... B60R 7/04
296/37.7
6,003,925 A * 12/1999 Litke .................... B60R 7/04
16/319
(Continued)

FOREIGN PATENT DOCUMENTS

CN      201895616 U    7/2011
CN      102656053 A    9/2012
(Continued)

OTHER PUBLICATIONS

International Search Report dated Aug. 6, 2015 for International Application No. PCT/US2015/033829.
(Continued)

*Primary Examiner* — Jason S Morrow
*Assistant Examiner* — E Turner Hicks

(57) ABSTRACT

An assembly configured to be installed in a vehicle interior is disclosed. The assembly may comprise a base configured for attachment at the attachment point in the vehicle interior and a component coupled to the base configured for movement relative to the base from (a) a storage (or shipping) position wherein the attachment feature is accessible for attachment of the base to the vehicle interior to (b) an installed (or pivot) position wherein the component blocks the attachment feature. The component may comprise a set of members or tabs configured to move from a biased position to retain the component in the storage position to a deflected position to allow movement of the component from the storage position to the installed position. The member may comprise a recess and/or ribs configured to facilitate retention of the component in the storage position. The base may comprise a set of guides and a set of notches; the component may comprises a set of protrusions or pins configured so that the component may slide within guides as the component is moved between the storage position (e.g.
(Continued)

in the recesses) and the installed position (e.g. in the notches). The base and the component may be shipped together and installed into the vehicle interior as a unit; the component may be movable from the storage/shipping position to the installed/pivot position after installation into the vehicle interior. The component may pivot or rotate relative to the base in use. The component may comprises a cover, a lens, a button, a door, a cover with lens, a lens assembly, a door on a hinge, a cover on a hinge, etc. A method of installing a console providing a base and a cover providing a lens to a vehicle interior is also disclosed.

19 Claims, 11 Drawing Sheets

Related U.S. Application Data

(60) Provisional application No. 62/006,341, filed on Jun. 2, 2014.
(58) Field of Classification Search
USPC .............................................. 296/37.7, 37.8
See application file for complete search history.

(56) References Cited

U.S. PATENT DOCUMENTS

| | | | | |
|---|---|---|---|---|
| 6,062,623 | A * | 5/2000 | Lemmen | B60R 7/04 224/282 |
| 7,137,659 | B2 | 11/2006 | Tiesler et al. | |
| 7,422,352 | B2 * | 9/2008 | Sakakibara | B60R 7/04 362/154 |
| 8,505,994 | B2 * | 8/2013 | Park | B60R 1/008 296/24.34 |
| 8,733,990 | B2 * | 5/2014 | Smith | B60R 7/04 362/488 |
| 2006/0061119 | A1 | 3/2006 | Tiesler et al. | |
| 2008/0252090 | A1 | 10/2008 | Tiesler et al. | |

FOREIGN PATENT DOCUMENTS

| | | |
|---|---|---|
| JP | 2009-149115 A | 7/2009 |
| WO | 2011059982 A1 | 5/2011 |

OTHER PUBLICATIONS

Written Opinion of the International Searching Authority dated Aug. 6, 2015 for International Application No. PCT/US2015/033829.

\* cited by examiner

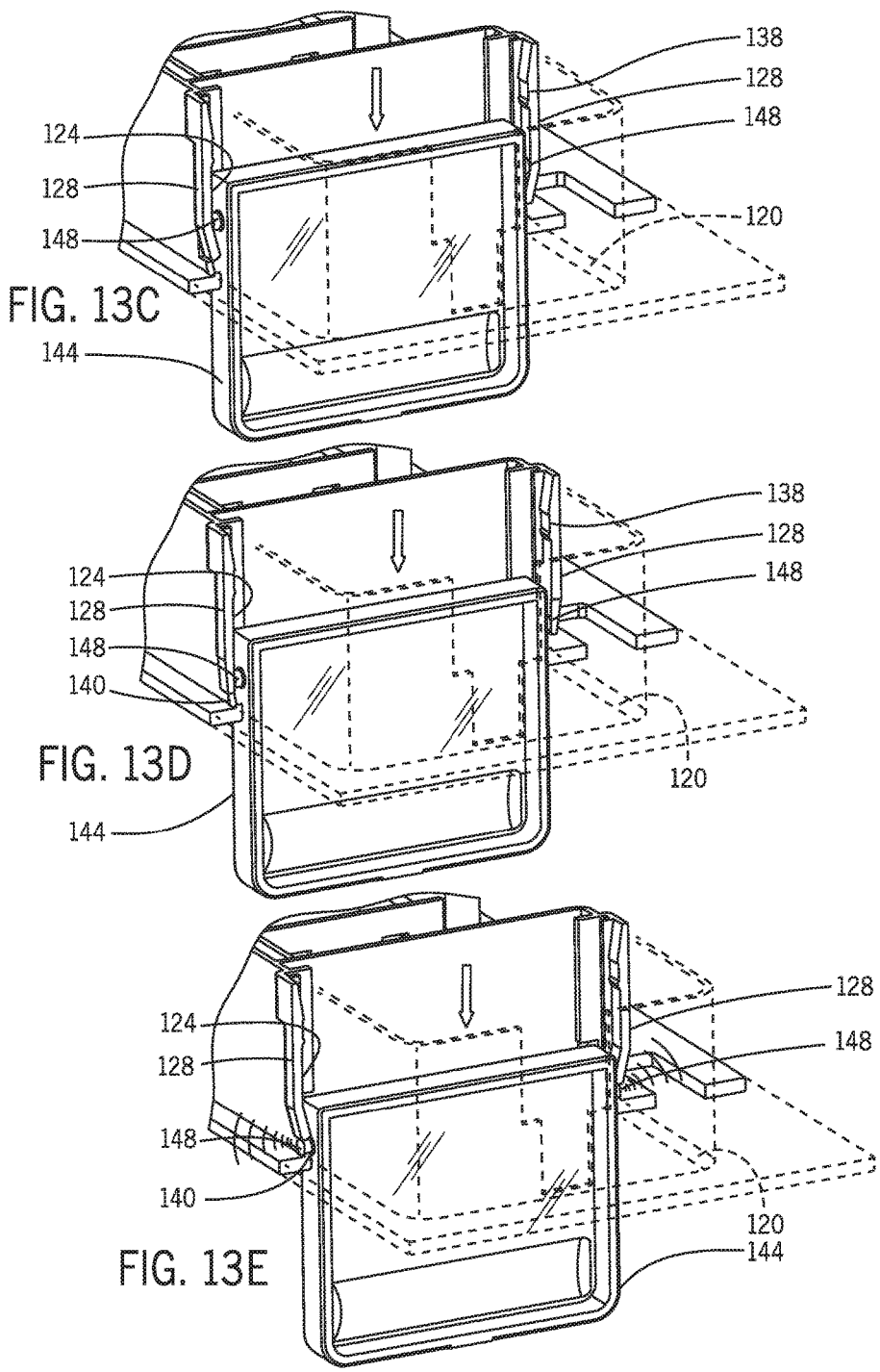

CONSOLE ASSEMBLY

CROSS REFERENCE TO RELATED APPLICATIONS

The present application is a continuation of International Application No. PCT/US15/33829 titled "CONSOLE ASSEMBLY" filed Jun. 2, 2015.

The present application claims priority from and the benefit of and incorporates by reference in entirety the following applications: (a) International Application No. PCT/US15/33829 titled "CONSOLE ASSEMBLY" filed Jun. 2, 2015; (b) U.S. Provisional Patent Application No. 62/006,341 titled "CONSOLE ASSEMBLY" filed Jun. 2, 2014.

FIELD

The present invention relates to a console assembly. The present invention also relates to an overhead console.

BACKGROUND

It is well-known to provide an overhead console in a vehicle interior. Overhead consoles are used in vehicle interiors for functional and/or aesthetic purposes. Overhead consoles may include one or more task lamps (e.g. typically include a lamp located within a compartment of the overhead console with a lens covering the compartment). Overhead consoles may be attached in a vehicle interior by fasteners such as screws. In such known overhead console installation (providing lamps), the lenses may be shipped to the vehicle manufacturer separately from the remainder of the overhead console (e.g. the base); the lens (or lenses) would be attached after installation to the base of the console. Shipment of lenses separate from the remainder of the overhead console will typically require attachment/joining of the bases and base at installation which may increase the manufacturing challenges and costs for the overhead console assembly and vehicle; separate shipment of lenses and base may potentially increase the risk of damage that might occur to the lenses during shipping.

It would be advantageous to provide an improved console assembly in which the base and lenses may be shipped together as a unit and installed conveniently into the vehicle.

SUMMARY

The present invention relates to an assembly configured to be installed in a vehicle interior by an attachment feature at an attachment point. The assembly may comprise a base configured for attachment at the attachment point in the vehicle interior and a component coupled to the base configured for movement relative to the base from (1) a storage position wherein the attachment feature is accessible for attachment of the base to the vehicle interior to (2) an installed position wherein the component blocks the attachment feature. The component may be configured to be retained in the storage position; the component may be configured to be retained in the installed position. The component may be configured to be retained in the storage position by a retaining feature in the base; the component may be configured to be retained in the storage position by a closure in the base. The base may comprise a set of members to retain the component in position. The installed position may comprise a pivot position for the component. The assembly may also comprise a tab configured to move from a biased position to retain the component in the storage position to a deflected position to allow movement of the component from the storage position to the installed position. Each member of the set of members may comprise a recess configured to facilitate retention of the component in the storage position; each member of the set of members may comprise a rib configured to facilitate retention of the component in the storage position; each member of the set of members may comprise a tab coupled to the base. The base may comprise a guide; the tab may comprise an end configured to deflect to allow movement of the component in the guide relative to the base from the storage position to the installed position. The base may further comprise a set of guides; the component may comprises a set of protrusions; each protrusion of the set of protrusions may be configured to be retained within a guide of the set of guides so that the component by the set of protrusions is configured to slide within the set of guides as the component is moved between the storage position and the installed position. The storage position may comprise a shipping position. The base and the component may be configured to be shipped together and installed into the vehicle interior as a unit; the component may be movable from the storage position to the installed position after installation of the assembly into the vehicle interior. The component may be configured to at least one of pivot relative to the base or rotate relative to the base as the component moves from the storage position to the installed position. The retaining feature may comprise a detent in a track of the base engaged by the component. The closure may comprise a detent provided at a contact point of the component with the base. The component may be configured to provide in response to movement of the component from the storage position to the installed position at least one of an audible signal or a haptic signal. The base may comprise a structure configured to prevent movement of the component from the installed position to the storage position.

The component may comprise at least one of (a) a cover; (b) a lens; (c) a button; (d) a door; (e) a cover with lens; (f) a lens assembly; (g) a door on a hinge; (h) a cover on a hinge. The base may comprise a set of recesses to retain the component in the installed position; a recess to retain the component in the installed position may comprise at least one of (a) a notch; (b) a seat; (c) a support; (d) a stop; (e) a joint; (f) a hinge point; (g) an indentation. The base may comprise a set of recesses to retain the component in the storage position; a recess to retain the component in the storage position may comprise at least one of (a) an indentation; (b) a seat; (c) a stop; (d) a recess with adjacent rib. The base may comprise a set of members to retain the component in the installed position; a member to retain the component in the installed position may comprise at least one of (a) a tab; (b) an arm; (c) a resilient member; (d) a deflecting member; (e) a clip; (f) a retaining clip. The base may comprise a set of protrusions to retain the component in the storage position; a protrusion to retain the component in the storage position may comprise at least one of (a) a rib; (b) a shelf; (c) a ridge; (d) a lip; (e) a ridge adjacent a recess.

The present invention also relates to a console assembly for use in a vehicle. The console assembly may comprise a housing comprising a compartment configured to receive a lamp and a cover providing a lens configured to move within the compartment from a storage position to an installed position. The compartment may comprise an opening; the cover may be configured to cover the opening in the installed position; the cover may be configured to be retained in the housing in the installed position. The installed position may comprise a pivot position. The console assembly may further comprise a member and a recess adjacent the member; at least a portion of the cover is maintained within the recess by the member when the cover is in the installed position. The member may be configured to prevent the cover from moving out of the installed position; the recess comprises a notch; the cover may comprise a pin configured to be received within the notch when the cover is in the installed position. The housing may comprise a guide; the member may comprise a recess configured to retain the pin to maintain the cover in the storage position; the pin may be configured to slide in the guide as the cover moves from the storage position to the installed position. The housing may provide a set of members and a set of notches and a set of guides configured for a set of pins of the cover; each member of the set of members may comprise a recess with an adjacent rib to retain each pin of the set of pins to retain the cover in the storage position; the set of pins may be guided along the set of guides as the cover is moved to the installed position; each pin of the set of pins may be retained in a notch of the set of notches of the housing when the cover is in the installed position. The member may be configured to move to a deflected position in response to the cover with pin sliding from the storage position to the pivot position of the cover; the member may be configured to retain the pin in a notch when the cover is in the installed position.

The present invention also relates to a method of installing a console providing a base and a cover providing a lens to a vehicle interior. The method may comprise aligning an attachment feature of the console to an attachment location of the vehicle interior; fastening the console to the vehicle interior; sliding the cover relative to the base from a storage position to a pivot position; and pivoting the cover relative to the base from the pivot position to an installed position. The cover in the installed position may be configured to conceal the attachment feature of the console. The storage position may comprise a shipping position. The installed position may comprise the pivot position; the pivot position may comprise a hinge for the cover; sliding the cover may comprise sliding the cover in a guide; sliding the cover may comprise sliding the cover in a track. The cover may comprise a set of pins configured to be engaged in a set of recesses when the cover is in the storage position. The base of the console may comprise a set of notches configured to retain the set of pins when the cover is in the pivot position. The base of the console may comprise a set of guides to engage the set of pins of the cover. The console may comprise a set of members configured to deflect for the set of pins as the cover may be moved from the storage position to the pivot position. The console may comprise a set of notches to retain the set of pins when the cover is in the pivot position.

The present invention relates to a console assembly for use in a vehicle includes a housing defining a compartment in which a lamp is receivable, a track at least partially within the compartment, and a lens movable within the track from a storage position in which an interior space of the compartment is accessible for installation of the console assembly in the vehicle toward an installed position in which the interior space of the compartment is covered by the lens.

The present invention relates to a method of installing a console assembly in a vehicle comprising providing a housing defining a compartment in which a lamp is receivable and in which a lens is supported at least partially within the compartment in a storage position; installing the console assembly in the vehicle by accessing a mounting hole in the compartment with the lens in the storage position; and repositioning the lens from the storage position to an installed position in which the compartment is covered by the lens.

The present invention relates to an assembly configured to be installed in a vehicle comprising a base installable in the vehicle and a component configured to be retained by a retaining feature in the base in a first state for shipping prior to installation in the vehicle to be retained by a closure in the base in a second state for use after installation in the vehicle; wherein the base and the component are configured to be shipped together and installed into the vehicle as a unit; and wherein the component is movable from the first state to the second state after installation of the assembly into the vehicle.

The present invention relates to a combination comprising a container; and a plurality of assemblies within the container, each of the assemblies being configured to be installed in a vehicle, and each of the assemblies comprising a base installable in the vehicle and a component retained by the base in a first state for shipping prior to installation in the vehicle and a second state for use after installation in the vehicle; wherein the base and the component are shipped together in the container and installed into the vehicle as a unit.

FIGURES

FIGS. 13A to 13G are schematic perspective detail views of the shipment/storage and installation/use of the console assembly for a vehicle interior according to an exemplary embodiment.

DESCRIPTION

Figure 1:
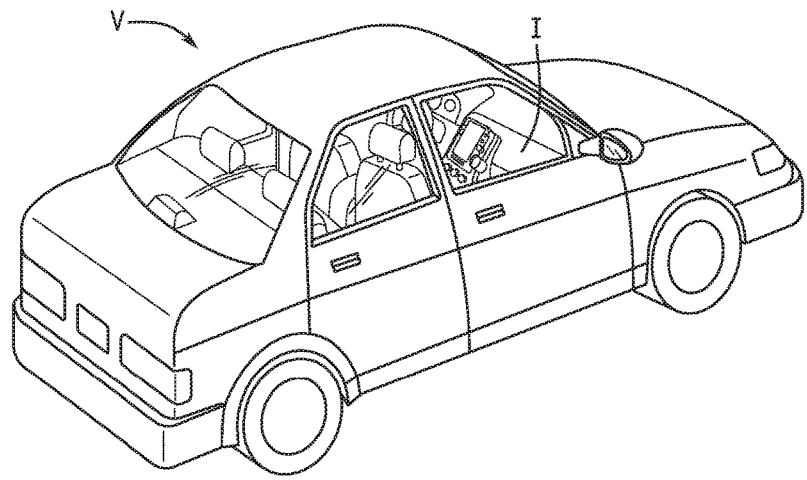
FIG. 1 is a schematic perspective view of a vehicle according to an exemplary embodiment.
Figure 2:
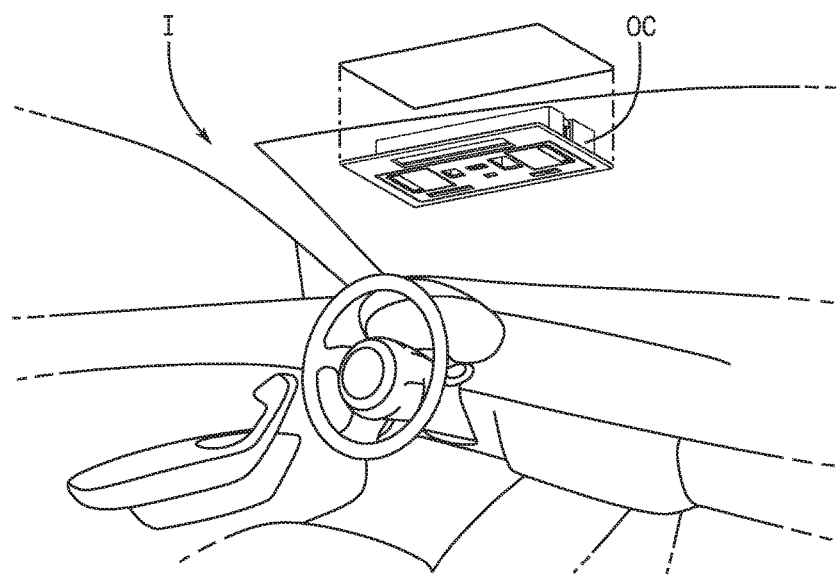
FIG. 2 is a schematic perspective partial view of a vehicle interior with an overhead console assembly according to an exemplary embodiment.
Figure 3A:
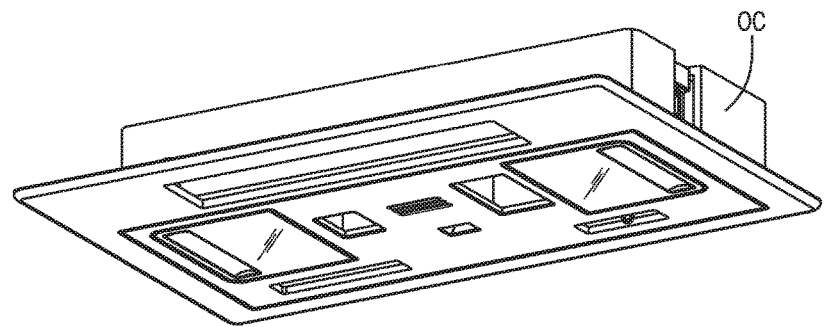
FIG. 3A is a schematic perspective view of an overhead console assembly according to an exemplary embodiment.

Referring to FIGS. 1 and 2 a vehicle providing a vehicle interior I with a console assembly shown as overhead console OC is shown schematically according to an exemplary embodiment. As indicated schematically in FIGS. 2 and 3A, console OC is installed in the vehicle interior (e.g. during vehicle assembly). As shown schematically according to an exemplary embodiment in FIGS. 2, 3A-3B and 4-6, the overhead console OC comprises (among other components) a base 104 and a set of covers 144; as indicated, the covers 144 may comprise a lens/lens assembly 144 (e.g. through which a lamp within the base may provide illumination in the vehicle interior (see e.g. FIGS. 3A, 8B and 12D).

According to an exemplary embodiment, the console assembly OC is configured to be shipped to the vehicle manufacturer in a manner intended to facilitate efficient assembly/installation into the interior of the vehicle. See e.g. FIGS. 1, 2, 3B, 6, 8A, 11, 12A-12B and 13B-13E (e.g. configuration of console assembly and installation).

Figure 11:
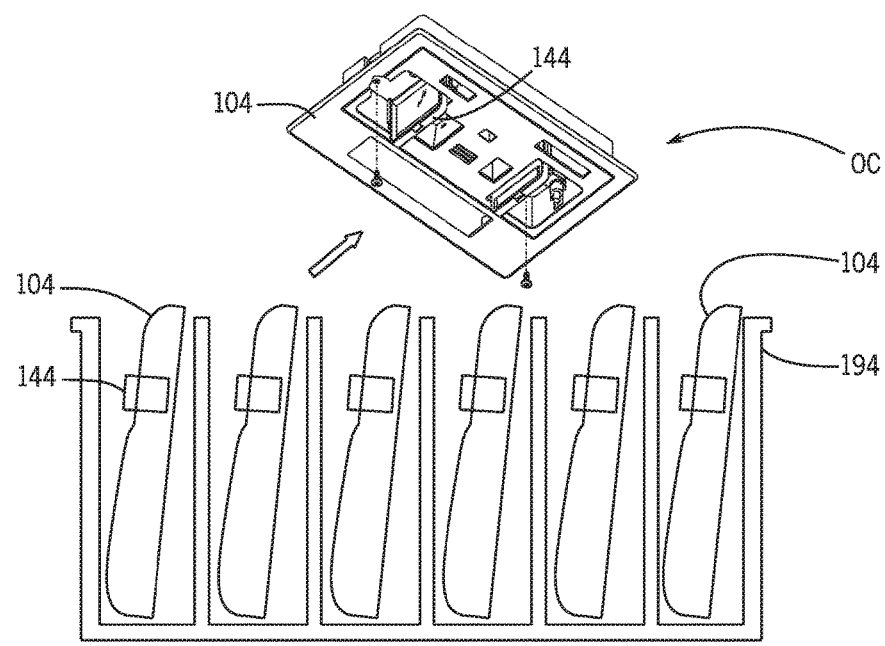
FIG. 11 is a schematic diagram of an improved shipping arrangement for components of a console assembly according to an exemplary embodiment.
Figure 12A:
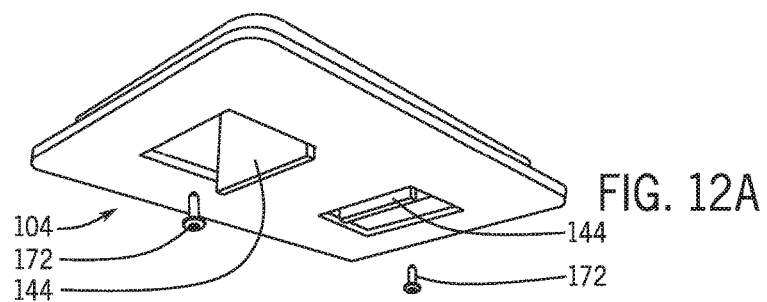
FIGS. 12A to 12D are schematic perspective views of shipment/storage and installation/use of the console assembly for a vehicle interior according to an exemplary embodiment.
Figure 12B:
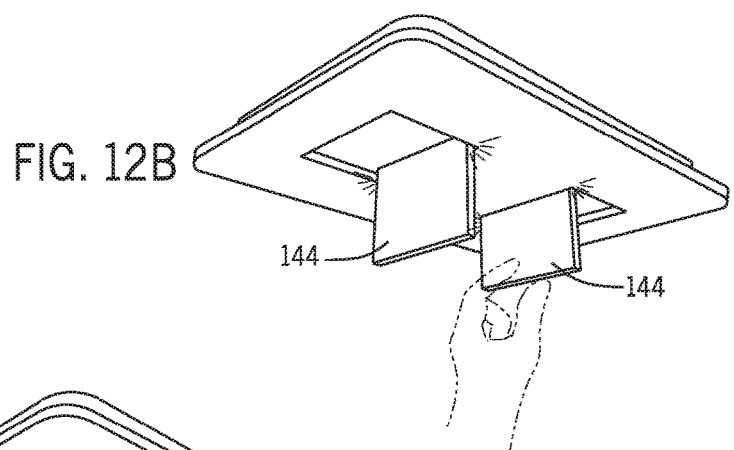
Figure 12C:
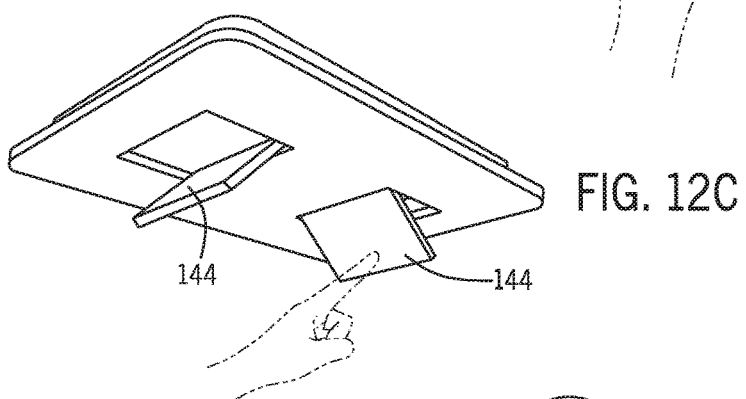

As indicated schematically according to an exemplary embodiment in FIGS. 2, 11 and 12A, the console assembly (e.g. base 104) is secured at attachment points in the vehicle interior (e.g. by fasteners such as screws 172) for installation; the covers (e.g. cover/lens assemblies 144) of the console assembly are located into an installed position (e.g. a use/pivot position) during the installation in the vehicle interior. See FIGS. 12B-12D.

Figure 6:
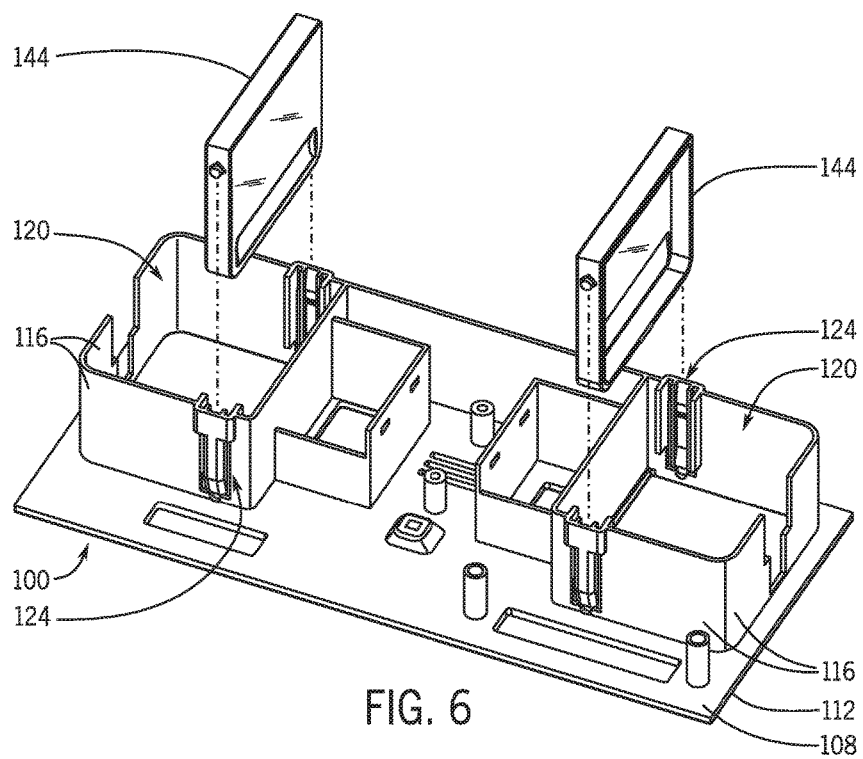
FIG. 6 is a schematic exploded perspective view of the overhead console assembly according to an exemplary embodiment.

As shown schematically according to an exemplary embodiment in FIGS. 6 and 11, covers 144 and base 104 of the console assembly OC can be partially assembled for shipment of the console assembly OC to the vehicle manufacturer. As indicated schematically, base 104 provides a set of guides or tracks 124 each with a member or tab 128 into which projections or pins 148 of cover 144 are located. See also FIGS. 7A-7B and 13A-13B. As indicated schematically in FIGS. 6, 11, 12A, 13A-13B and 14A, the pins 148 of cover can be located within track 124 of the base by deflection of member 128 into an indentation or recess 138 adjacent to rib 136 to provide a storage or shipping position; when cover 144 is in the storage/shipping position relative to base 104 the console assembly can be stored in a shipping container shown as pallet 194 (see FIG. 11); for installation, the complete assembly (e.g. base with cover) is provided and installed as a unit. See FIGS. 2, 8A-8B, 11, 12A-12B, 13A-13B and 14A.

As shown schematically according to an exemplary embodiment, at installation the cover 104 by pins 148 is located within guide or track 124 of the base from the storage position to an installed position (e.g. use or pivot position). See FIGS. 2, 8A-8B, 12B-12D, 13E-13G and 14B.

As indicated schematically, the pins 148 of the cover deflect the member 128 as the pins 148 travel along guide 124 toward end 126 of member 128 and into recess shown as notch 140 (e.g. to form a pivot or pivot joint). See e.g. FIGS. 13A-13E. As shown schematically, cover 144 is pivotally coupled to base 124 when pins 148 are located (e.g. seated, retained, etc.) by end 126 of member 128 in recess shown as notch 140. See FIGS. 7A-7B, 8A, 13E and 14B. See also FIGS. 12A-12D.

As shown schematically according to an exemplary embodiment, an assembly shown as a console assembly OC may be configured to be installed in an interior I of a vehicle V by an attachment feature at an attachment point. See FIGS. 1, 2, 3A and 13A-13G. As shown schematically the assembly may comprise a base 104 configured for attachment at the attachment point in the vehicle interior and a component such as a cover and/or lens assembly 144. See FIGS. 2, 3A and 4-6. According to an exemplary embodiment, the component (e.g. cover, lens, etc.) is coupled to the base configured for movement relative to the base from (a) a storage position wherein the attachment feature is accessible for attachment of the base to the vehicle interior to (b) an installed position wherein the component blocks the attachment feature. See FIGS. 2, 3A-3B, 12A-12D and 13A-13G. The component may be configured to be retained in the storage position (see FIGS. 13B and 14A); the component may be configured to be retained in the installed position (see FIGS. 13E and 14B). According to an exemplary embodiment, the component may be configured to be retained in the storage position by a feature (e.g. recess, etc.) in the base; the component may be configured to be retained in the installed position by a feature (e.g. notch, etc.) in the base. See FIGS. 7A-7B and 14A-14B.

According to an exemplary embodiment, the base may comprise a set of members 128 (e.g. tab, clip, etc.) to retain the component in position. See FIGS. 7A-7B. According to an exemplary embodiment, the installed position may comprise a pivot position for the component. See FIGS. 12A-12D. The tab or member 128 may be configured to move from a biased position to retain the component in the storage position to a deflected position to allow movement of the component from the storage position to the installed position. See FIGS. 7A-7B and 13A-13G. According to an exemplary embodiment, each member 128 of the set of members may comprise a recess 138 (e.g. indentation, etc.) configured to facilitate retention of the component in the storage position; each member 128 of the set of members may comprise a rib 136 (e.g. ridge, protrusion, lip, etc.) configured to facilitate retention of the component in the storage position; each member 128 of the set of members may comprise a tab coupled to the base. See FIGS. 7A-7B and 13A-13G. According to an exemplary embodiment, the base may comprise a guide 124 (e.g. track, groove, etc.); the tab may comprise an end 126 configured to deflect to allow movement of the component in the guide 124 relative to the base from the storage position to the installed position. See FIGS. 7A (undeflected) and 7B (deflected). According to an exemplary embodiment, the base may further comprise a set of guides; the component may comprises a set of protrusions 148 (e.g. pin hinge, pivot pins, etc.); each protrusion of the set of protrusions 148 may be configured to be retained within a guide 124 of the set of guides so that the component by the set of protrusions (e.g. pins) is configured to slide within the set of guides as the component is moved between the storage position and the installed position. See FIGS. 7A-7B and 13A-13G.

As shown schematically according to an exemplary embodiment, the storage position may comprise a shipping position. See FIGS. 11 and 13A-13B (e.g. component put into storage position for shipment). The base and the component may be configured to be shipped together and installed into the vehicle interior as a unit; the component may be movable from the storage position to the installed position after installation of the assembly into the vehicle interior. See FIGS. 2 and 11.

The component may be configured to at least one of pivot relative to the base or rotate relative to the base as the component moves from the storage position to the installed position. See FIGS. 8A-8B and 12A-12D.

According to an exemplary embodiment, the retaining feature may comprise a detent in a track of the base engaged by the component. See FIGS. 7A-7B. The closure may comprise a detent provided at a contact point of the component with the base. See FIGS. 7A-7B (hinge), 8A-8B and 12C-12D (closure). The component may be configured to provide in response to movement of the component from the storage position to the installed position at least one of an audible signal or a haptic signal. See FIGS. 12D, 13B and 13E. The base may comprise a structure configured to prevent movement of the component from the installed position to the storage position. See FIGS. 12A-12D.

According to an exemplary embodiment, the component comprises at least one of (a) a cover; (b) a lens; (c) a button; (d) a door; (e) a cover with lens; (f) a lens assembly; (g) a door on a hinge; (h) a cover on a hinge. See FIGS. 3A-3B, 4-6, 8A-8B and 12A-12D. According to an exemplary embodiment, the base may comprise a set of recesses to retain the component in the installed position; a recess to retain the component in the installed position may comprise at least one of (a) a notch; (b) a seat; (c) a support; (d) a stop; (e) a joint; (f) a hinge point; (g) an indentation. See FIGS. 7A-7B (showing recess 140). According to an exemplary embodiment, the base may comprise a set of recesses to retain the component in the storage position; a recess to retain the component in the installed position may comprise at least one of (a) an indentation; (b) a seat; (c) a stop; (d) a recess with adjacent rib 136. According to an exemplary embodiment, the base may comprise a set of members to retain the component in the installed position; a member 128 to retain the component in the installed position may comprise at least one of (a) a tab; (b) an arm; (c) a resilient member; (d) a deflecting member; (e) a clip; (f) a retaining clip. See FIGS. 7A-7B (schematically showing member 124) and 14B. According to an exemplary embodiment, the base may comprise a set of protrusions (shown as ribs 136 in FIGS. 7A-7B and 14A) to retain the component in the storage position (e.g. at rib 136/adjacent recess 138); the protrusion to retain the component in the installed position may comprise at least one of (a) a rib; (b) a shelf; (c) a ridge; (d) a lip; (e) a ridge adjacent a recess. See FIGS. 7A-7B (schematically showing rib 136) and FIG. 14A.

As shown schematically according to an exemplary embodiment, the arrangement of the mechanism/feature to retain and guide the cover/component in the base (e.g. for storage/shipping and installation/use) may be configured with the guides/members (with recess features) on the cover and the protrusions/pins (with features) on the base (e.g. reversal of parts) to provide for the cover to be retained in the base for storage/shipment and use/installation. See FIGS. 7A-7B, 9 and 12A-12D.

As shown schematically according to an exemplary embodiment, a console assembly for use in a vehicle may comprise a housing comprising a compartment configured to receive a lamp and a cover (e.g. providing a lens) 144 configured to move within the compartment from a storage position to an installed position. See FIGS. 2, 3A-3B, 4-6 and 12A-12D. The compartment may comprise an opening; the cover 144 may be configured to cover the opening in the installed position; the cover may be configured to be retained in the housing in the installed position (e.g. the installed position may comprise a pivot position). The console assembly OC may further comprise a member 128 and a recess adjacent the member 128 (see FIGS. 7A-7B); at least a portion of the cover 144 is maintained within the recess by the member 128 when the cover 144 is in the installed position. As shown schematically, the member 128 may be configured to prevent the cover 144 from moving out of the installed position (see FIGS. 7A-7B and 14B); according to an exemplary embodiment, the recess comprises a notch 140; the cover 144 may comprise a pin 148 configured to be received within the notch 140 when the cover is in the installed position (see FIG. 14B). As shown schematically, the housing may comprise a guide 124; the member 128 may comprise a recess 138 configured to retain the pin 148 to maintain the cover in the storage position; the pin 148 may be configured to slide in the guide 124 as the cover moves from the storage position to the installed position. See FIGS. 7A-7B and 13A-13E. As shown schematically according to an exemplary embodiment, the housing may provide a set of members and a set of notches and a set of guides configured for a set of pins of the cover (see FIGS. 13A-13G); each member 128 of the set of members may comprise a recess with an adjacent rib 136 to retain each pin 148 of the set of pins to retain the cover in the storage position (see FIG. 14A); the set of pins may be guided along the set of guides as the cover is moved to the installed position (see FIGS. 13A-13E); each pin 148 of the set of pins may be retained in a notch 140 of the set of notches of the housing when the cover is in the installed position. See FIGS. 7A-7B, 9, 13A-13E and 14B. As shown schematically according to an exemplary embodiment, the member 128 may be configured to move to a deflected position in response to the cover 144 with pin 148 sliding from the storage position to the pivot position of the cover 144; the member 128 may be configured to retain the pin 148 in a notch 140 when the cover is in the installed position. See FIGS. 9 and 13A-13E.

As shown schematically according to an exemplary embodiment, a method of installing a console providing a base 104 and a cover 144 (e.g. providing a lens) to a vehicle interior may comprise the steps of aligning an attachment feature of the console to an attachment location of the vehicle interior (see FIGS. 2A and 12A); fastening the console to the vehicle interior; sliding the cover relative to the base from a storage position to a pivot position; and moving/locating and/or pivoting the cover relative to the base from the pivot position to an installed position. See FIGS. 13A-13G. The cover in the installed position may be configured to conceal the attachment feature of the console. See FIGS. 12A-12D. The storage position may comprise a shipping position. See FIG. 11. As shown schematically according to an exemplary embodiment, the installed position may comprise the pivot position; the pivot position may comprise a hinge for the cover (e.g. a hinge at a pivot joint 140). See FIGS. 12A-12D and 13E-13G. As shown schematically according to an exemplary embodiment, sliding the cover may comprise sliding the cover in a guide 124; sliding the cover may comprise sliding the cover in a track (e.g. guides 124). See FIGS. 13A-13E. As shown schematically according to an exemplary embodiment, the cover may comprise a set of pins 148 configured to be engaged in a set of recesses 136 when the cover is in the storage position. See FIGS. 9, 13A-13B and 14A. According to an exemplary embodiment, the base of the console may comprise a set of notches (e.g. recess 140) configured to retain the set of pins (e.g. pins 148) when the cover is in the pivot position. See FIGS. 7A-7B, 9 and 13E-13G. According to an exemplary embodiment, the base of the console may comprise a set of guides (e.g. tracks 124) to engage the set of pins of the cover. See FIGS. 3A-3B, 4-6, 7A-7B and 13A-13G. According to an exemplary embodiment, the console may comprise a set of members (e.g. members shown as tabs/arms 128) configured to deflect for the set of pins as the cover may be moved from the storage position to the pivot position. See FIGS. 7A-7B and 13C-13E. According to an exemplary embodiment, the console may comprise a set of notches (e.g. shown as notch/recess 140) to retain the set of pins when the cover is in the pivot position (e.g. to form a hinge/pivot). See FIGS. 7A-7B, 13E and 14B. See also FIGS. 8A-8B, 12B-12D and 13E-13G.

Exemplary Embodiments

According to an exemplary embodiment, FIGS. 1 and 2 show a vehicle 10 and an interior 20 of a vehicle 10 in which an overhead console assembly 104 is installed. As shown schematically in FIG. 3, the overhead console assembly 104 (in accordance with an embodiment of the invention) includes a lens housing 100 and a console housing 160 defining a cavity 156 in which the lens housing 100 is received. (As shown schematically according to an exemplary embodiment, once connected the housings 100, 160 of assembly 104 may be considered as a single housing and/or may be integrally formed as a single piece.) As shown schematically in FIG. 6, the lens housing 100 includes a top surface 108 and a bottom surface 112. A plurality of side walls 116 extend from the top surface 108 and define (e.g. with the console housing 160) a compartment 120 in which a lamp 180 (see e.g. FIGS. 4 and 5) is receivable.

According to an exemplary embodiment, lens housing 100 has two compartments 120 for respective lenses (or other arrangements/numbers of compartments/lenses according to an exemplary embodiment); in each compartment 120 of the embodiment the housing 100 includes opposed and aligned guides or tracks 124 that are coupled to (e.g. defined by or attached to) the side walls 116. See FIGS. 3A-3B and 4-6. According to an exemplary embodiment, the tracks 124 of the console assembly 104 are integrally formed with the housing 100 (e.g. using an injection molding process); according to an exemplary embodiment, the tracks 124 may be formed as separate pieces or components that are attached to the housing 100 using fasteners or adhesives. See FIGS. 3A-3B and 4-6. The tracks 124 can be formed on or defined at least in part by any other structure of the lens housing 100 or the console housing 160. See FIGS. 3A-3B and 4-6.

Figures 7A, 7B:
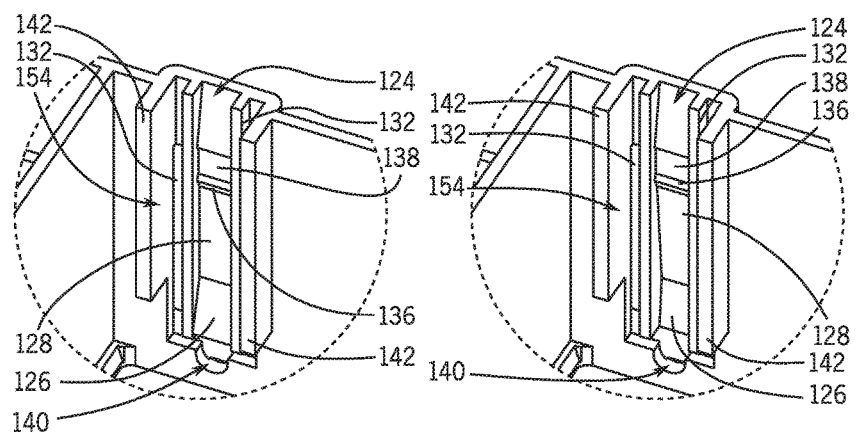
FIGS. 7A and 7B are schematic perspective detail views of a console assembly according to an exemplary embodiment.

As shown schematically according to an exemplary embodiment in FIG. 7A, each of the tracks 124 is at least partially defined by or includes a resilient detent member 128 having a pair of parallel track walls 132 and a lip 136 extending between the track walls 132; see also FIG. 7B. According to an exemplary embodiment, the detent member 128 is attached to the side wall 116 only along its top edge leaving the distal bottom edge of the detent member 128 unattached to the side wall 116 (e.g. providing a flexible tab). See FIGS. 3A-3B and 4-6. See also FIG. 7B. According to an exemplary embodiment, the lens housing 100 and the detent members 128 are made from a resilient material (e.g. plastic); each of the detent members 128 are movable from a biased first position in which the detent member 128 is substantially straight and parallel with the side wall 116 to a second position in which the detent member 128 is bent relative to the side wall 116 in response to a force acting on the free distal end of the detent member 128. See e.g. FIGS. 7A-7B. As shown schematically in FIG. 7A, the side walls 116 each include a detent recess 140 adjacent the free distal end of each of the detent members 128 and a pair of guides or guide walls 142. See FIGS. 3A-3B and 4-6. See also FIG. 7B.

As shown schematically according to an exemplary embodiment in FIGS. 3A-3B, 4 and 5, the console assembly 104 also includes a lens 144 received within the opposed tracks 124 (see e.g. FIGS. 4, 5 and 13A-13G) in each of the compartments 120. According to an exemplary embodiment, each of the lenses 144 includes an outer frame 146 and a translucent portion 152 bounded by the frame 146 that allows light from the lamp 180 to pass through. Each of the lenses 144 also includes coaxial pivots or protrusions 148 (see e.g. FIG. 9) that extend outward from opposite sides of the frame 146 and that are slidably received within the respective tracks 124 in each compartment 120; the protrusions 148 are received within and slidable along the track 124 between multiple positions (see e.g. FIGS. 13A-13G). According to an exemplary embodiment as shown schematically in FIG. 3B, each of the lenses 144 in a storage position in which the lenses 144 are supported at least partially within the compartment 120 and oriented substantially parallel to the tracks 124. According to an exemplary embodiment, the protrusions 148 on each of the lenses 144 are supported upon the respective lips 136 (see e.g. FIG. 7A) to suspend or otherwise retain each of the lenses 144 within the tracks 124 in the storage position; the lips 136 can provide resistance to sliding the lenses 144 from the storage position (see e.g. FIG. 3B); pulling on the lenses 144 with sufficient force will overcome the resistance provided by the lips 136 to allow the protrusions 148 and the remainder of each lens 144 to slide further downward within the track 124 and further outside of the compartment 120. See also FIG. 7B. According to an exemplary embodiment, the guide walls 142 (see e.g. FIG. 7A) define a slot 154 wider than the track 124 for receiving the lens frame 146 to maintain a parallel orientation of the lens 144 with the track 124 when in the storage position. See also FIG. 7B. According to an exemplary embodiment, when the lenses 144 are oriented in the storage position, openings 162 of the respective compartments 120 are unblocked by the lenses 144 and the interior of each compartment 120 is accessible by a user for installing the console assembly 104 to a vehicle. See e.g. FIGS. 13A-13G.

According to an exemplary embodiment, console assembly 104 has tracks 124 and slots 154; the console assembly is only provided with the tracks 124 and does not have guide walls 142. According to an exemplary embodiment, the lenses 144 can be prevented from rotating while in their storage positions or between their storage positions and pivot positions such as by an interference fit between the protrusions 148 and the tracks 124 in which the protrusions 148 are received, use of protrusions 148 having one or more flat sides that resist rotation of the lenses 144 when in the storage position and while being moved along the tracks 124, springs or other structure extending to a locations beside the lenses 144 and/or the protrusions 148 to limit rotation of the lenses 144 when in the storage positions and while being moved along the tracks 124.

Figure 3B:
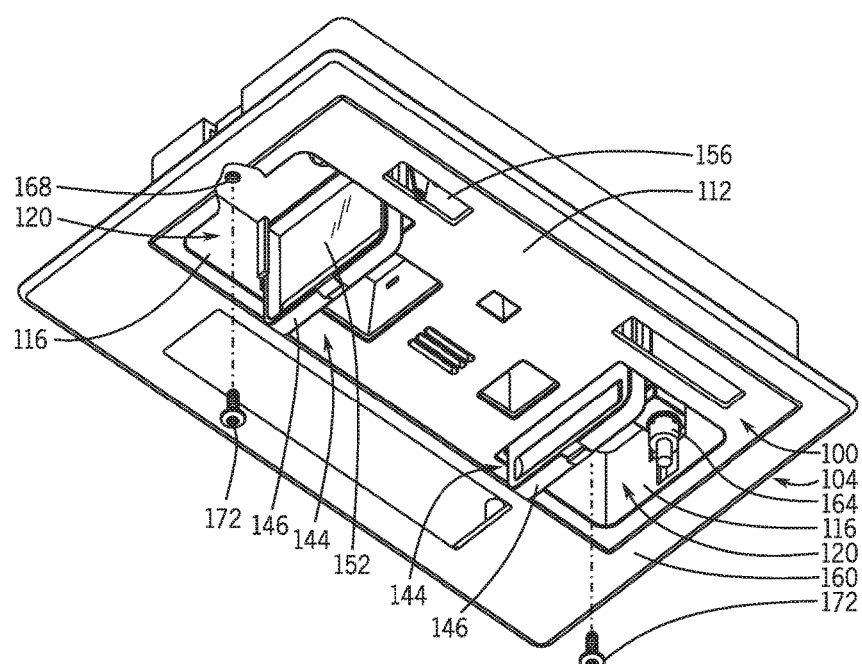
FIG. 3B is a schematic perspective view of an overhead console assembly according to an exemplary embodiment.
Figure 4:
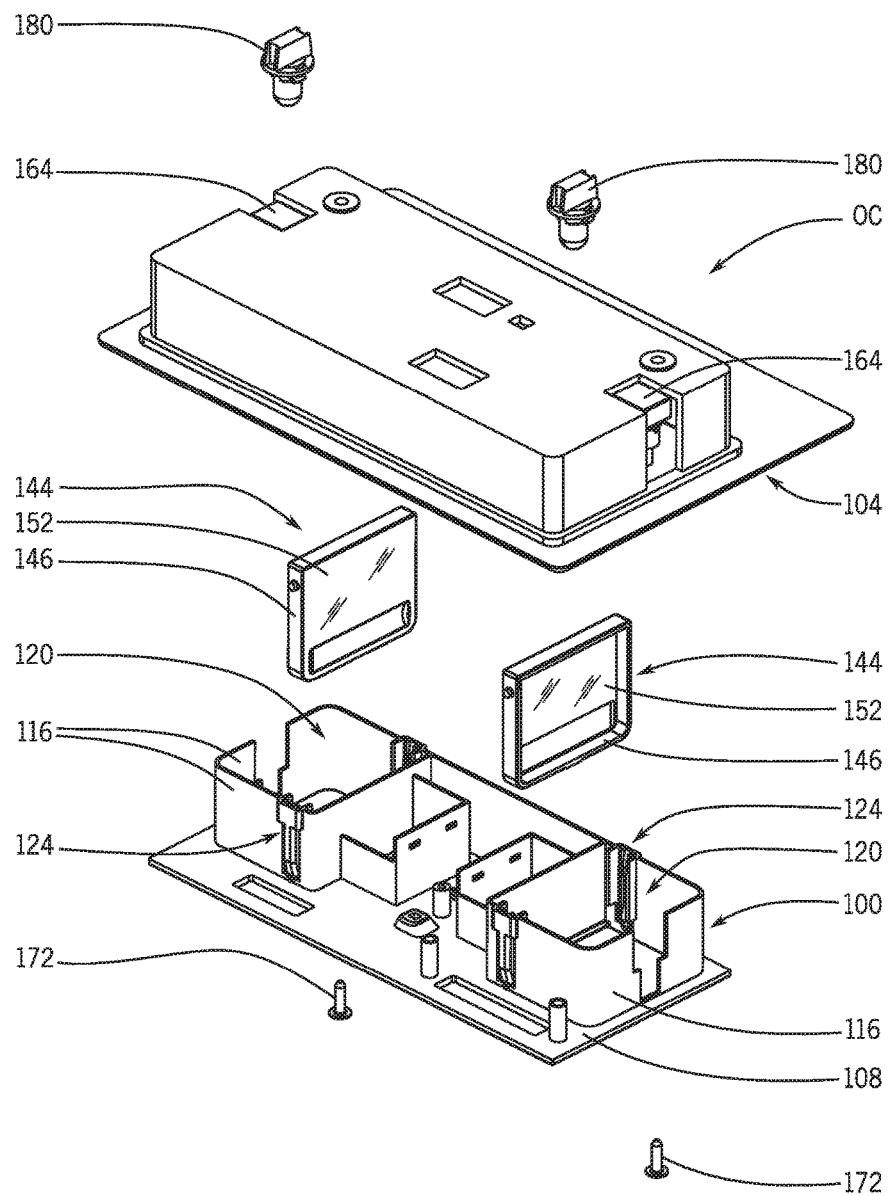
FIG. 4 is a schematic exploded perspective view of the overhead console assembly according to an exemplary embodiment.
Figure 5:
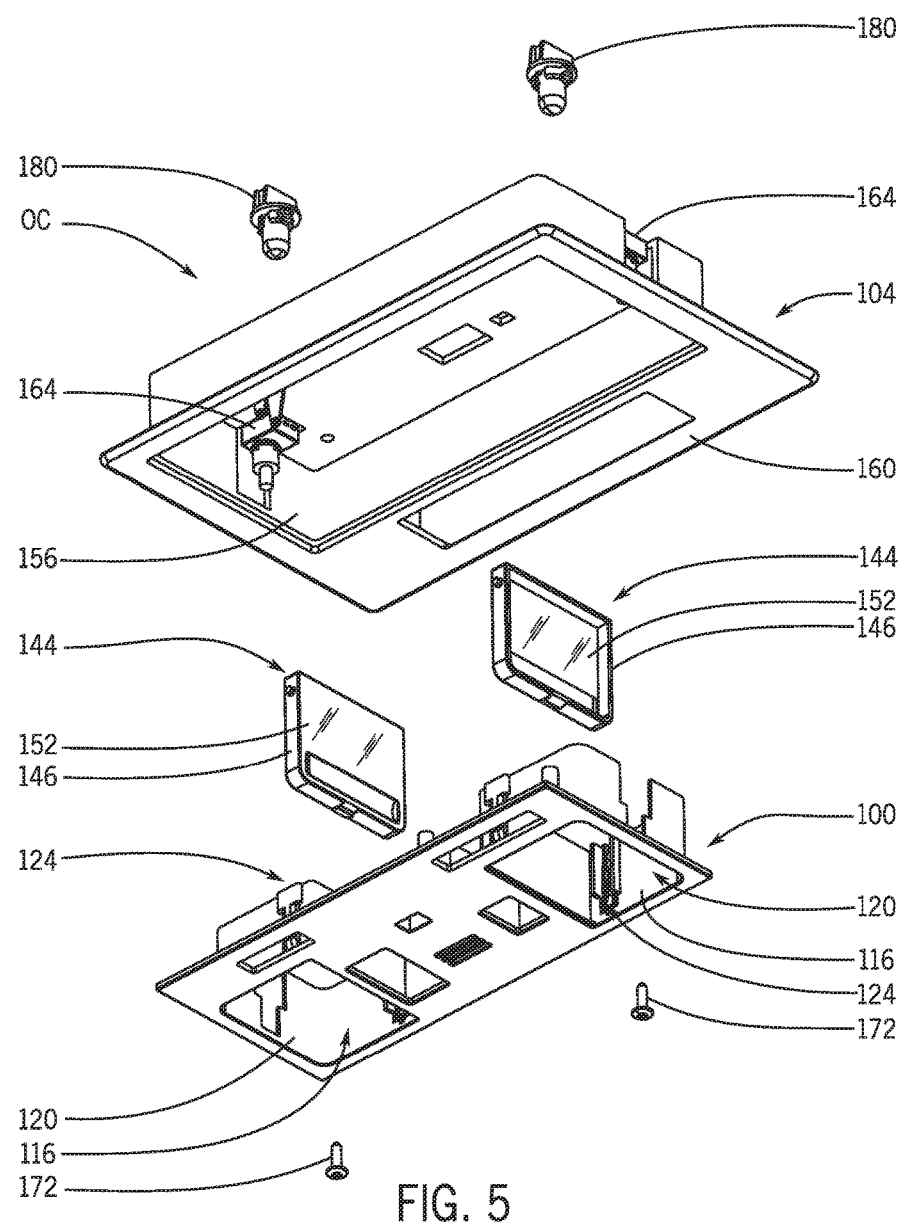
FIG. 5 is a schematic exploded perspective view of the overhead console assembly according to an exemplary embodiment.

As shown schematically according to an exemplary embodiment in FIGS. 3B and 5, the overhead console assembly 104 also includes a lamp actuator 164 positioned in each of the compartments 120 for separately turning the lamps 180 on and off. The lamp actuator 164 may be configured as a push-push style actuator that is engageable by the lens 144 such that pushing the lens 144 a first time causes the lamp 180 to turn on and pushing the lens 144 a second time causes the lamp 180 to turn off. Other types of lamp actuators 164 which are external or internal to the compartment 120 that may be used are sufficient for activating and deactivating the lamps 180.

As shown schematically according to an exemplary embodiment in FIG. 3B, the console housing 160 includes a mounting hole 168 within each of the compartments 120 for receiving a fastener 172 (e.g. screw, nail, rivet, etc.) (see e.g. FIG. 9) to attach the console assembly 104 to the vehicle during installation; not every console housing 160 having two or more compartments 120 need a mounting hole 168 in each compartment 120. The mounting holes 168 are accessible for driving the fasteners 172 into the vehicle when the lenses 144 are in the storage position.

According to an exemplary embodiment, access to the interior of each compartment 120 is needed or desirable for one or more other aspects of console assembly installation, such as to access areas (e.g. roof structure, vehicle frame, etc.) of the vehicle behind the console assembly 154. According to an exemplary embodiment, the console assembly 154 may be mounted in other manners not using fasteners inserted through mounting holes 168 such as a crimping operation (in which a portion of the console assembly 154 or vehicle structure adjacent the console assembly 154 is deformed after insertion of the console assembly 154 into a corresponding aperture in the vehicle), a "snap-fit" engagement (in which the console assembly 154 snaps into place using detents, tabs or other structure of the console assembly 154 and/or structure adjacent the console assembly 154), a bonding operation (in which adhesive material is applied to the console assembly 154 and/or to portions of the vehicle adjacent the console assembly 154 to secure the console assembly 154 in place within the vehicle), etc. See FIGS. 2, 3A-3B, 4-6. According to an exemplary embodiment, access through the compartments 120 of the console assembly 154 may be necessary or desirable. Storage and movement of the lenses 144 can enable access for any such manner of console assembly installation.

Figure 8A:
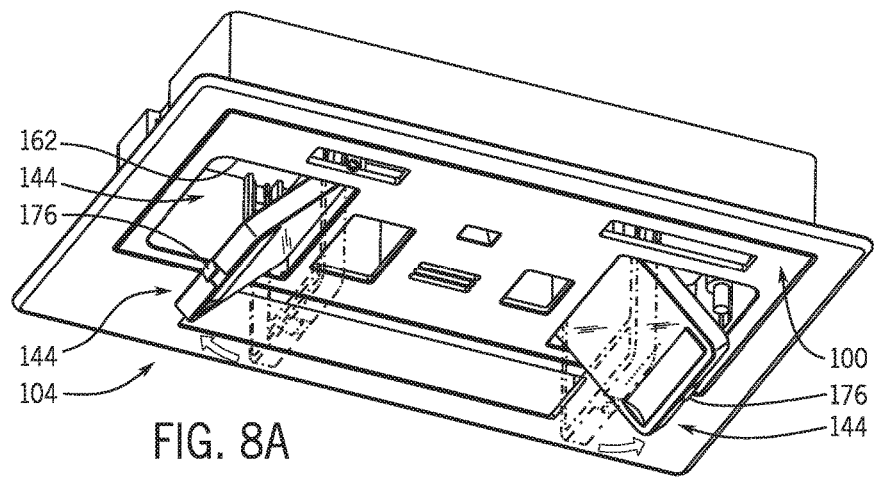
FIG. 8A is a schematic perspective view of the overhead console assembly with the cover in between an open position and a closed position according to an exemplary embodiment.
Figure 9:
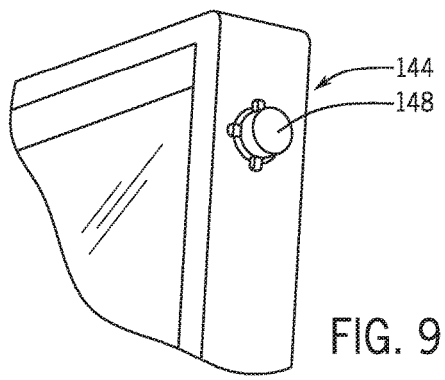
FIG. 9 is a schematic perspective partial view of the cover/lens compartment of a console assembly according to an exemplary embodiment.
Figure 8B:
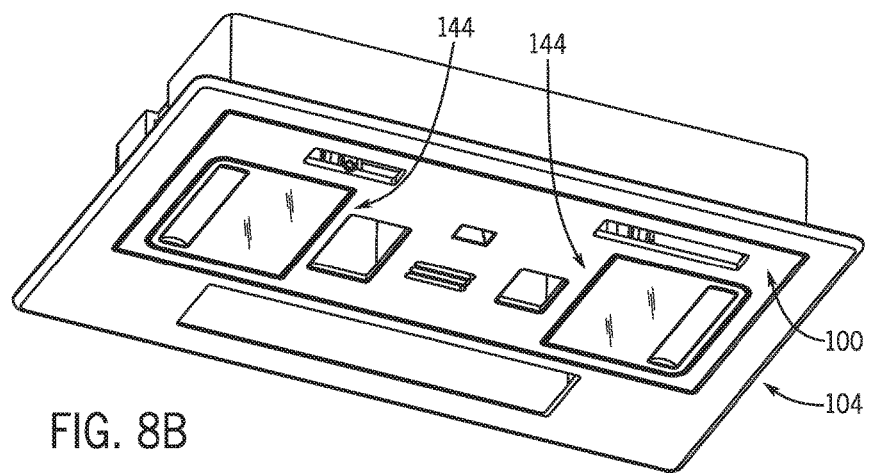
FIG. 8B is a schematic perspective view of the overhead console with the lenses in the closed position according to an exemplary embodiment.

As shown schematically in FIG. 8A, the lenses 144 are in a transition state or pivot position which is intermediate the storage position and a final installed position; the lenses 144 are slidable from the storage position to the pivot position by applying a sufficient force to the lenses 144 to overcome the resistance imparted by the lips 136. According to an exemplary embodiment, when in the pivot position the protrusions 148 are held within the detent recesses 140 by the detent members 128, such that the protrusions 148 are prevented from further sliding within the track 124; the lenses 144 are then pivotable relative to the housing 100 (see e.g. FIG. 8A) from the pivot position into an installed position (see e.g. FIG. 8B) in which the lenses 144 are oriented substantially perpendicular to the tracks 124 and the openings 162 of the compartments 120 are covered or blocked by the lenses 144. The lenses 144 include a snap 176 (e.g. employ a closure at the base) (see e.g. FIG. 8A) for holding the lenses 144 in the installed position but do not preclude further pivoting movement of the lenses 144 to actuate and de-actuate the lamp actuators 164.

Figure 12D:
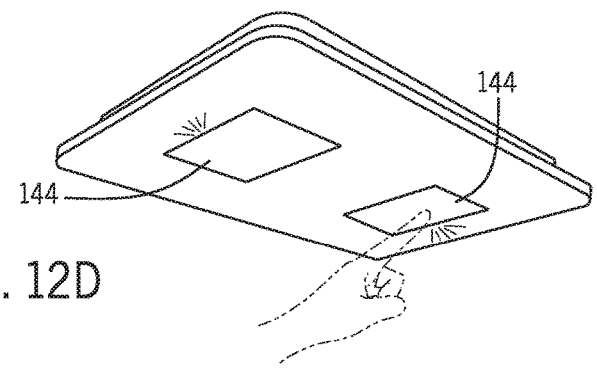
Figure 13A:
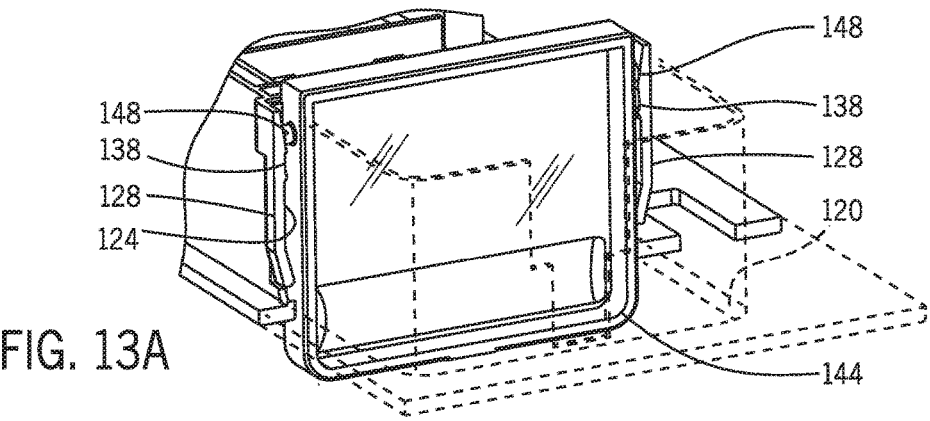
Figure 13B:
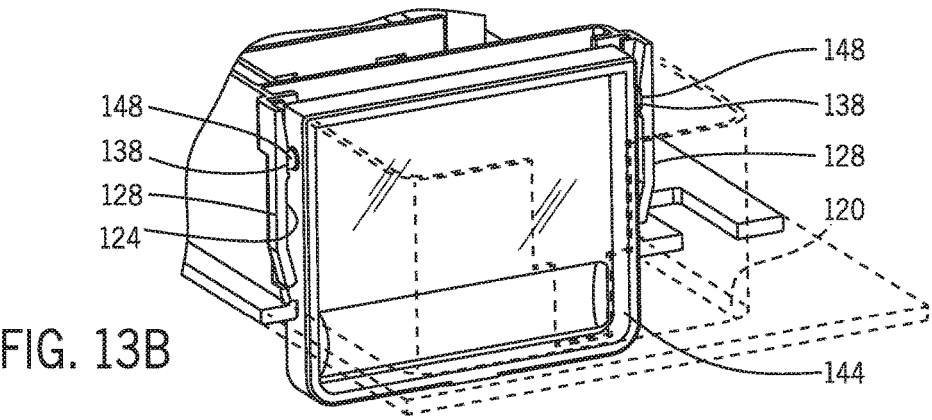
Figure 14A:
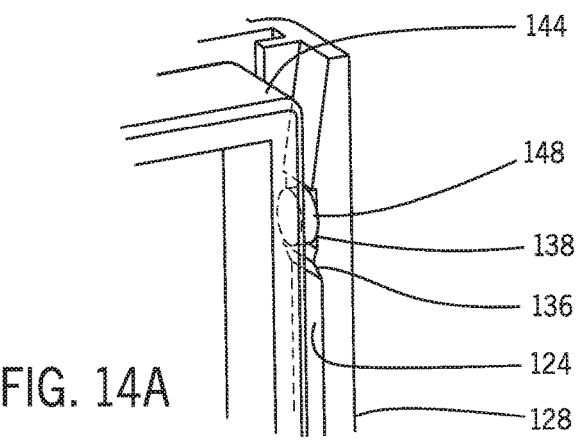
FIG. 14A is a schematic perspective detail view of the storage position of the cover of the console assembly according to an exemplary embodiment.
Figure 14B:
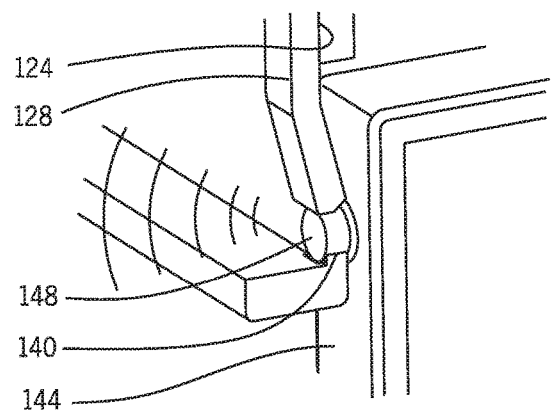
FIG. 14B is a schematic perspective detail view of the installation position of the cover of the console assembly according to an exemplary embodiment.
Figure 13F:
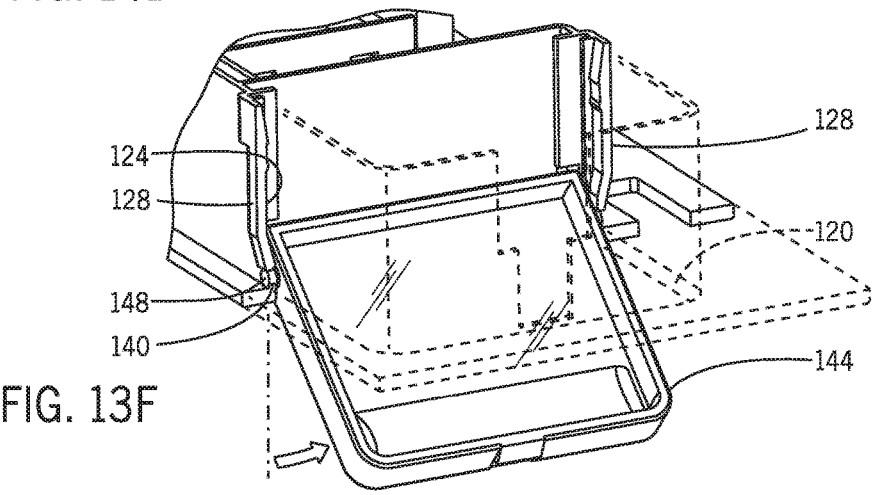
Figure 13G:
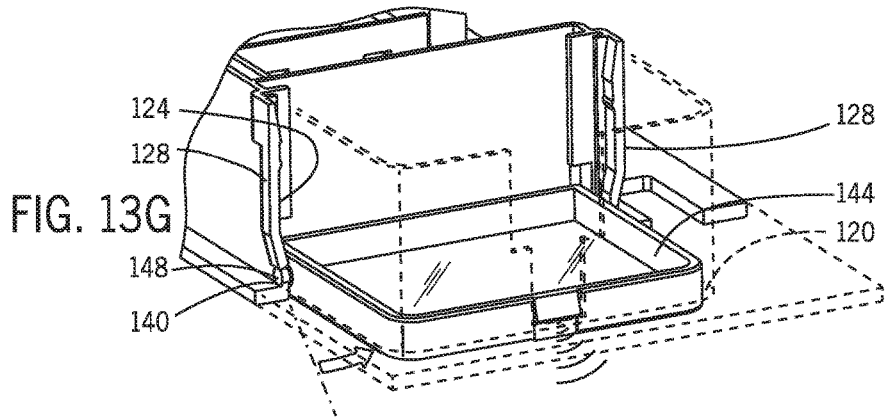

As shown schematically according to an exemplary embodiment, to install the overhead console assembly 104 into a vehicle (as shown in FIGS. 12A-12D including locating/rotating the covers/lenses 144 into an assembled state relative to the track 124 as shown in FIGS. 13A-13G), the console assembly 104 is first lifted into position adjacent the vehicle roof with the lenses 144 in the storage position (see e.g. FIG. 3B). The fasteners 172 are then inserted through the compartments 120 and the mounting holes 168 and driven into the vehicle roof to secure the console assembly 104 to the vehicle. The lenses 144 are then repositioned from the storage position into the installed position (see e.g. FIGS. 8B and 12D) in which the compartments 120 are covered by the lenses 144. The lenses 144 are slid downward within the tracks 124 by pulling the lenses 144 downward with a sufficient force to overcome the resistance imparted by the lips 136 and snapping the protrusions 148 into the detent apertures 140 (see e.g. FIG. 7A, 13C and 13E) creating an audible and/or haptic signal (e.g. a sound, feel, feedback, perceptible indication, etc.) to the installer that the protrusions 148 and the lenses 144 have been locked into the pivot position (see e.g. FIGS. 8A and 12B). The lenses 144 are then pivoted upward from the pivot position (see e.g. FIG. 12C) into the installed position (see e.g. FIGS. 8B and 12D) and snapped into place by engaging the snap 176 with a corresponding portion of the lens housing 100 creating another audible and/or haptic signal (e.g. a sound, feel, feedback, perceptible indication, etc.) as shown in FIGS. 12D and 13G. Once in the installed position the lenses 144 are touchable by an operator or passenger within the vehicle to turn the respective lamps 180 in the compartments 120 on and off.

Figure 10:
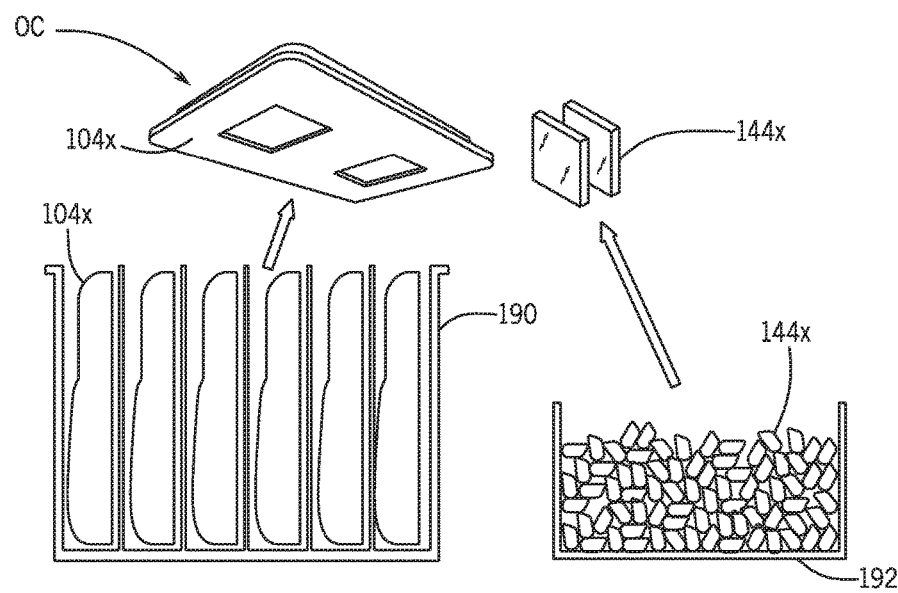
FIG. 10 is a schematic diagram of a conventional shipping arrangement for components of a console assembly according to an exemplary embodiment.

According to an exemplary embodiment, in a conventional arrangement the base 104x and cover/lenses 144x may be shipped separately in a pallet 190 to be assembled into a console assembly at the point of installation in a vehicle. See FIG. 10. According to an exemplary embodiment, the console assemblies OC may be shipped to a vehicle manufacturer pre-assembled in a single container 194; shipping and storage costs may be reduced and attendant time spent by the vehicle manufacturer pre-assembling the housing/base 104 and each cover/lenses 144 of the console assembly prior to installation of the console assembly in a vehicle may be eliminated entirely. See e.g. FIGS. 10 and 11. See also FIGS. 13A-13G.

According to an exemplary embodiment, the console assembly may comprise a housing defining a compartment in which a lamp is receivable and a track at least partially within the compartment. See e.g. FIGS. 4 and 13A-13G. According to an exemplary embodiment, a lens may be movable within the track from a storage position in which an interior space of the compartment is accessible for installation of the console assembly in the vehicle toward an installed position in which the interior space of the compartment is covered by the lens; the lens may be slidable within the track from the storage position toward the installed position; the lens may be slidable within the track from the storage position to a pivot position intermediate the storage and installed positions; the lens may be pivotable relative to the housing from the pivot position to the installed position; in the installed position, the lens may be oriented substantially perpendicular to the track. See e.g. FIGS. 12A-12D and 13E-13G. In the storage position, the lens may be oriented substantially parallel with the track. See e.g. FIGS. 11 and 13B.

According to an exemplary embodiment, the console assembly may further comprise a resilient detent member at least in part defining the track and a detent recess adjacent the detent member; at least a portion of the lens may be maintained within the detent recess by the detent member when the lens is in the installed position; the detent member may prevent the lens from sliding within the track when the lens is in the installed position. The detent recess may be defined within the housing adjacent the track; the lens may include a protrusion that is received within the detent recess when the lens is in the installed position; the detent recess may include a lip engageable by the protrusion to maintain the lens in the storage position; the protrusion may be slidable within the track from the storage position of the lens, over the lip and toward a pivot position of the lens intermediate the storage and installed positions. See e.g. FIGS. 7A-7B and 13A-13G. According to an exemplary embodiment, the detent member may be deflectable away from a biased position in response to the protrusion sliding within the track from the storage position of the lens to the pivot position of the lens; the detent member may resume the biased position in response to the protrusion being received within the detent recess. See e.g. FIGS. 7A-7B and 13A-13G.

According to an exemplary embodiment, the console assembly may further comprise a mounting hole in the housing through which a fastener may be receivable for installation of the console assembly in the vehicle; the mounting hole may be accessible when the lens is in the storage position; the compartment may include an opening unblocked by the lens when in the storage position; the opening may be blocked by the lens when in the installed position. See e.g. FIGS. 4-5, 8A-8B, 9 and 12A-12D.

According to an exemplary embodiment, a method of installing a console assembly in a vehicle may comprise providing a housing defining a compartment in which a lamp is receivable and in which a lens is supported at least partially within the compartment in a storage position, installing the console assembly in the vehicle by accessing a mounting hole in the compartment with the lens in the storage position and repositioning the lens from the storage position to an installed position in which the compartment is covered by the lens. See e.g. FIGS. 12A-12D and 13A-13G. According to an exemplary embodiment, repositioning the lens from the storage position to the installed position may further comprise sliding the lens within a track coupled to the housing and at least partially located within the compartment; repositioning the lens from the storage position to the installed position may further comprise pivoting the lens from the pivot position into the installed position. According to an exemplary embodiment, the method may further comprise snapping the lens into a pivot position intermediate the storage position and the installed position in which sliding movement of the lens within the track is prevented. See FIGS. 7A-7B and 13A-13G.

According to an exemplary embodiment, an assembly configured to be installed in a vehicle may comprise a base installable in the vehicle and a component configured to be retained by a retaining feature in the base in a first state for shipping prior to installation in the vehicle and to be retained by a closure in the base in a second state for use after installation in the vehicle; the base and the component are configured to be shipped together and installed into the vehicle as a unit; the component may be movable from the first state to the second state after installation of the assembly into the vehicle (see e.g. FIGS. 11 and 14B with assembled base 104 and cover 144) in comparison to a state of the art example (see e.g. FIG. 10 with separate base 104x and lenses 144x) in which the components are shipped separately from the base, and are assembled after shipping. According to an exemplary embodiment, the component may be coupled to the base for installation in the vehicle as a unit; the component may be one of a lens, a cover, a button and a door; the component may be a first of a plurality of components each of which may be retained to the base in the first state for shipping prior to installation in the vehicle and the second state for use after installation in the vehicle.

According to an exemplary embodiment, the base may further comprise a guide and a resilient detent member at least in part defining the guide; the base may include a guide along which the component is slidable between the first state and the second state. See FIGS. 3A-3B and 4-6. According to an exemplary embodiment, component may include a pivot received within and slidable along the guide between the first state and the second state; according to an exemplary embodiment, between a transition state and the second state, the component may be pivotable relative to the base about the pivot; between a transition state and the second state, the component may be disengaged from the guide. See e.g. FIGS. 13A-13E. According to an exemplary embodiment, the component may be configured to provide an audible and/or haptic signal in response to a transition between the first state and the transition state; the component may be secured to the base in the second state and inhibited from returning to the first state. See e.g. FIGS. 14A and 14B.

According to an exemplary embodiment, a combination may comprise a container and a plurality of assemblies within the container; each of the assemblies may be configured to be installed in a vehicle; each of the assemblies may comprise a base installable in the vehicle and a component retained by the base in a first state for shipping prior to installation in the vehicle, and a second state for use after installation in the vehicle (e.g. vehicle interior). See FIGS. 10 and 11. The base and the component may be shipped together in the container and installed into the vehicle (e.g. vehicle interior) as a unit; the base may be installed in the vehicle using tools. See FIG. 11. In the first state, the component may be protected during shipping. The component may be deployed from the first state to the second state without using tools. See e.g. FIGS. 11, 12A-12D and 13A-13G. The component may be secured in the second state without using tools.

According to an exemplary embodiment, the component may be a lens (e.g. cover, door, lens, etc. for an optical or lighting element), button or other element potentially susceptible to damage in shipping. See e.g. FIGS. 10 and 11. The component may be provided with the base for shipping rather than being shipped separately from the base; the component may be provided in the base in a state that is intended to protect the component from exposure, physical contact, etc. that may otherwise occur if the component is shipped separately from the base. See e.g. FIGS. 10 and 11. According to an exemplary embodiment, the assembly may be configured so that the base (with the component) is shipped in a container (with multiple assemblies) and then removed from the container and installed in the vehicle and then the component is moved to a use state or position after installation in the vehicle; the component may be moved relative to the base to be nested or protected during shipping (e.g. transverse to the base and at least partially shielded within the base), to facilitate installation (e.g. to expose internal fastening points such as screw holes, mounting plates, etc.) and to be secured in a use state after installation (e.g. "snapped" into a secure and stable use position). See e.g. FIGS. 11 and 12A-12D. According to an exemplary embodiment, each container (e.g. shipping pallet or container) may include multiple assemblies that are each substantially complete for installation with the base and the component (e.g. lens, optical element, button, other element) into a vehicle. See FIG. 11.

According to an exemplary embodiment, although the tracks 124 and slots 154 of the console assemblies 104 are disclosed in pairs (i.e. two tracks 124 and two slots 154 for each lens 144), only a single track 124 and/or a single slot 154 is provided for each lens 144; each lens 144 can have a single protrusion 148 in a single track 124 and slot 154 while still having sufficient support and guidance in the various lens positions. See FIGS. 3A-3B and 4-6. See also e.g. FIGS. 7A-7B and 13A-13G.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The embodiments described in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

The invention claimed is:

1. A console assembly for use in a vehicle comprising:
   (a) a housing comprising a compartment configured to receive a lamp;
   (b) a cover providing a lens configured to move relative to the housing from a storage position to an installed position;
   (c) a member configured to engage a projection to facilitate guided movement of the cover relative to the housing from the storage position through an intermediate position to the installed position;
   (d) a seat for the projection when the cover is in the installed position relative to the housing;
   wherein the compartment comprises an opening;
   wherein the cover is configured to cover the opening in the installed position;
   wherein the cover is configured to be retained by the housing in the installed position;
   wherein the member comprises a flexible member.

2. The console assembly of claim 1 wherein the housing comprises a guide and the member;
   wherein the cover comprises the projection and the projection comprises a pin;
   wherein the member comprises a recess configured to retain the pin to maintain the cover in the storage position; and
   wherein the pin is configured to slide in the guide as the cover moves from the storage position to the installed position.

3. The console assembly of claim 1 wherein the member comprises a set of members;
   wherein the housing comprises the set of members and a set of notches and
   a set of guides configured for a set of pins of the cover;
   wherein each member of the set of members comprises a recess with an adjacent rib to retain each pin of the set of pins to retain the cover in the storage position;
   wherein the set of pins is guided along the set of guides as the cover is moved to the installed position;
   wherein each pin of the set of pins is retained in a notch of the set of notches of the housing when the cover is in the installed position.

4. The console assembly of claim 1 further comprising a recess adjacent the member;
   wherein at least a portion of the cover is maintained within the recess by the member when the cover is in the installed position.

5. The console assembly of claim 4 wherein the member is configured to prevent the cover from moving out of the installed position.

6. The console assembly of claim 4 wherein the installed position comprises a pivot position;
   wherein the member is configured to move to a deflected position in response to the cover with a pin sliding from the storage position to the pivot position of the cover;
   wherein the member is configured to retain the pin in a notch when the cover is in the installed position.

7. The console assembly of claim 1 wherein the seat comprises a notch; wherein the projection comprises a pin configured to be received within the notch when the cover is in the installed position.

8. A method of installing a console providing a base and a cover providing a lens to a vehicle interior comprising the steps of:
   (a) aligning an attachment feature of the console to an attachment location of the vehicle interior;
   (b) fastening the console to the vehicle interior;
   (c) sliding the cover relative to the base from a storage position through an intermediate position to a pivot position;
   (d) pivoting the cover relative to the base from the pivot position to an installed position;
   wherein the cover in the installed position is configured to conceal the attachment feature of the console
   wherein the cover is retained in the storage position for shipment and guided through the intermediate position during installation and retained in the installed position after installation.

9. The console assembly of claim 1 wherein the housing comprises the member; wherein the member is configured to move (a) from a biased position to retain the cover in the storage position (b) to a deflected position to allow movement of the cover from the storage position to the installed position.

10. The console assembly of claim 1 wherein the member comprises a tab.

11. The console assembly of claim 1 wherein the member comprises at least one of a recess or an indentation configured to retain the cover in the storage position.

12. The console assembly of claim 1 wherein the member comprises at least one of a rib; a ridge; a protrusion; a lip configured to retain the cover in the storage position.

13. The console assembly of claim 1 wherein the housing comprises the member; wherein the member comprises a tab and a guide; wherein the tab comprises an end configured to deflect to allow movement of the cover in the guide relative to the housing from the storage position to the installed position.

14. The console assembly of claim 13 wherein the guide comprises at least one of a track or a groove.

15. The console assembly of claim 13 wherein the cover is configured to slide within the guide as the cover is moved between the storage position and the installed position.

16. The console assembly of claim 13 wherein the cover comprises the projection; and wherein the projection comprises a set of protrusions comprising a protrusion configured to be retained within the guide.

17. The console assembly of claim 16 wherein the set of protrusions is configured to slide within the guide as the component is moved between the storage position and the installed position.

18. The console assembly of claim 16 wherein the set of protrusions comprises a least one of a set of pin hinges or a set of pivot pins.

19. A console assembly for use in a vehicle comprising:
(a) a housing comprising a compartment configured to receive a lamp;
(b) a cover providing a lens configured to move from a storage position to an installed position;
wherein the compartment comprises an opening;
wherein the cover is configured to cover the opening in the installed position;
wherein the cover is configured to be retained by the housing in the installed position;
wherein the housing provides a set of members and a set of notches and a set of guides configured for a set of pins of the cover;
wherein each member of the set of members comprises a recess with an adjacent rib to retain each pin of the set of pins to retain the cover in the storage position;
wherein the set of pins is guided along the set of guides as the cover is moved to the installed position;
wherein each pin of the set of pins is retained in a notch of the set of notches of the housing when the cover is in the installed position.

* * * * *